United States Patent [19]

Kawano

[11] Patent Number: 4,928,781
[45] Date of Patent: May 29, 1990

[54] REAR WHEEL SUSPENSION DEVICE FOR VEHICLES OF SMALL SIZE

[75] Inventor: Shizuo Kawano, Saitama, Japan

[73] Assignee: Honda Giken Kogyo Kabushiki Kaisha, Tokyo, Japan

[21] Appl. No.: 201,865

[22] Filed: Jun. 3, 1988

[51] Int. Cl.⁵ .............................................. B62K 25/20
[52] U.S. Cl. ...................................... 180/227; 280/284
[58] Field of Search ................ 180/219, 227; 280/283, 280/284, 288

[56] References Cited

U.S. PATENT DOCUMENTS 4,463,964  8/1984  Takayanagi et al. ................ 280/284
4,700,799 10/1987  Akiokawano ........................ 280/284

Primary Examiner—Charles A. Marmor
Assistant Examiner—Karin Tyson
Attorney, Agent, or Firm—Lyon & Lyon

[57] ABSTRACT

A motorcycle rear wheel suspension device is disclosed which the damper for the pivotally-connected swing arm mounting the rear wheel derives additional support from the auxiliary frame. The auxiliary frame is connected at one end with the damper and with the motorcycle body frame and at its other end to another position on the vehicle. By means of the organization the damper loading to the vehicle frame is advantageously distributed so that supporting frame members of reduced size and weight can be employed.

5 Claims, 4 Drawing Sheets

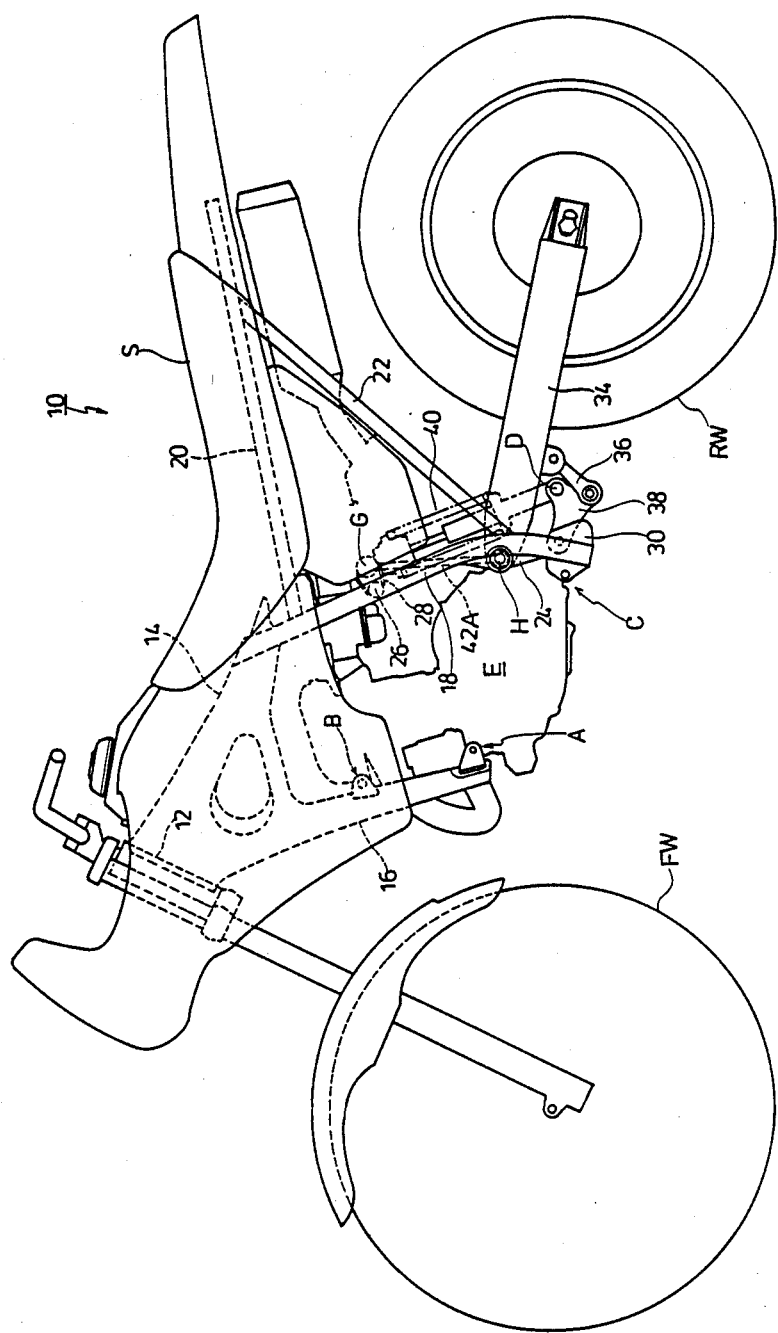

REAR WHEEL SUSPENSION DEVICE FOR VEHICLES OF SMALL SIZE

BACKGROUND OF THE INVENTION

The present invention relates to vehicles of small size, such as a motorcycle or the like, which may be provided with an engine between longitudinally spaced front and rear wheels and with a damper which is positioned between the vehicle body frame and the rear fork, the latter being swingably supported at its front end on the vehicle body frame and has the rear wheel rotatably supported by a shaft at its rear end. More particularly, the present invention relates to a rear wheel suspension device used in such small sized vehicles.

Shown in FIG. 1 is a known rear wheel suspension device for a motorcycle; for example, as described in Japanese Patent Laid-Open No. 60-163782 (No. 163782/1985). In this device, a rear fork 01 is swingably supported on the vehicle body frame 02 by a shaft at the point P. A rear wheel RW is rotatably supported by a shaft at the rear end of the rear fork 01. At the front end portion of the rear fork 01 is connected the lower end of a damper 04 through the intermediary of a well known progressive link mechanism 03. The upper end of the damper 04 is swingably connected to a bracket 06 attached to the rear end of a main pipe 05.

In such a structure which connects the damper 04 to the bracket 06 of the vehicle body frame, a large bending moment acts on the bracket 06 itself and on the main pipe 05. For this reason, these members must be provided with great strength and rigidity and therefore, such a structure results in a vehicle body of increased weight as well as of increased manufacturing cost due to the need to provide a support member having a large diameter and increased wall thickness. It is to the amelioration of this problem, therefore, to which the present invention is directed.

SUMMARY OF THE INVENTION

It is, accordingly, an object of the present invention to provide a small sized vehicle having an engine between the front and rear wheels thereof and a damper inserted between the vehicle body frame and a rear fork that is swingably supported at its front end on the vehicle body frame and which has a shaft at its rear end for rotatably supporting the rear wheel. This structural arrangement allows the load acting on the vehicle body frame to be dispersed according to the connecting relationship with the upper end of the damper, whereby the vehicle body frame can be formed of members that are of reduced wall thickness, small in diameter, and light in weight.

This object is attained by the fact that an auxiliary frame is provided, one end of which is swingably supported by a shaft coaxially disposed with respect to an upper end of the damper and the other end of which is swingably supported on the vehicle body frame, or on the engine, by a shaft, and that the supporting point of the latter shaft is below the plane which intersects perpendicularly with the center axis of the damper through the shaft supporting point of the upper end of the auxiliary frame.

For a better understanding of the invention, its operating advantages and the specific objectives obtained by its use, reference should be made to the accompanying drawings and description which relate to the preferred embodiments thereof.

BRIEF DESCRIPTION OF THE DRAWINGS

FIG. 9 is a side view showing a motorcycle which incorporates a rear wheel suspension device according to a variant of the present invention.

DETAILED DESCRIPTION OF THE PREFERRED EMBODIMENTS

Figure 1:
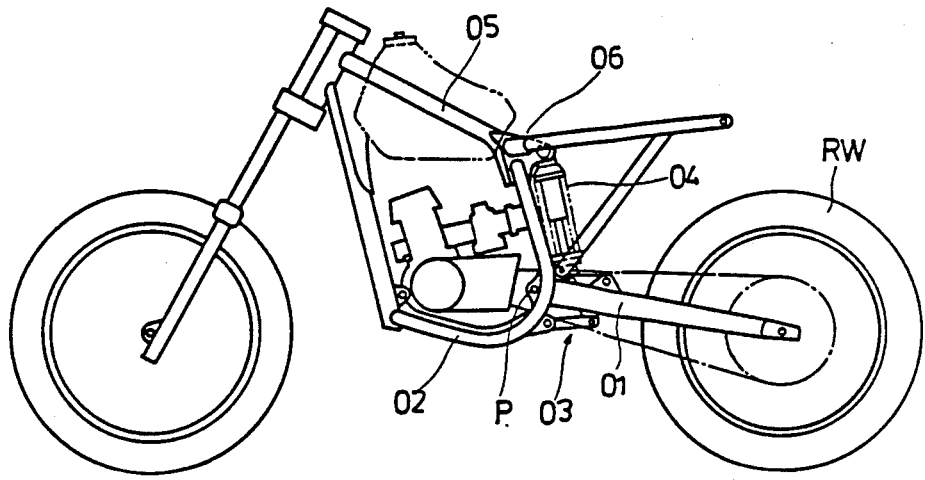
FIG. 1 is a side view of a motorcycle of the prior art.
Figure 2:
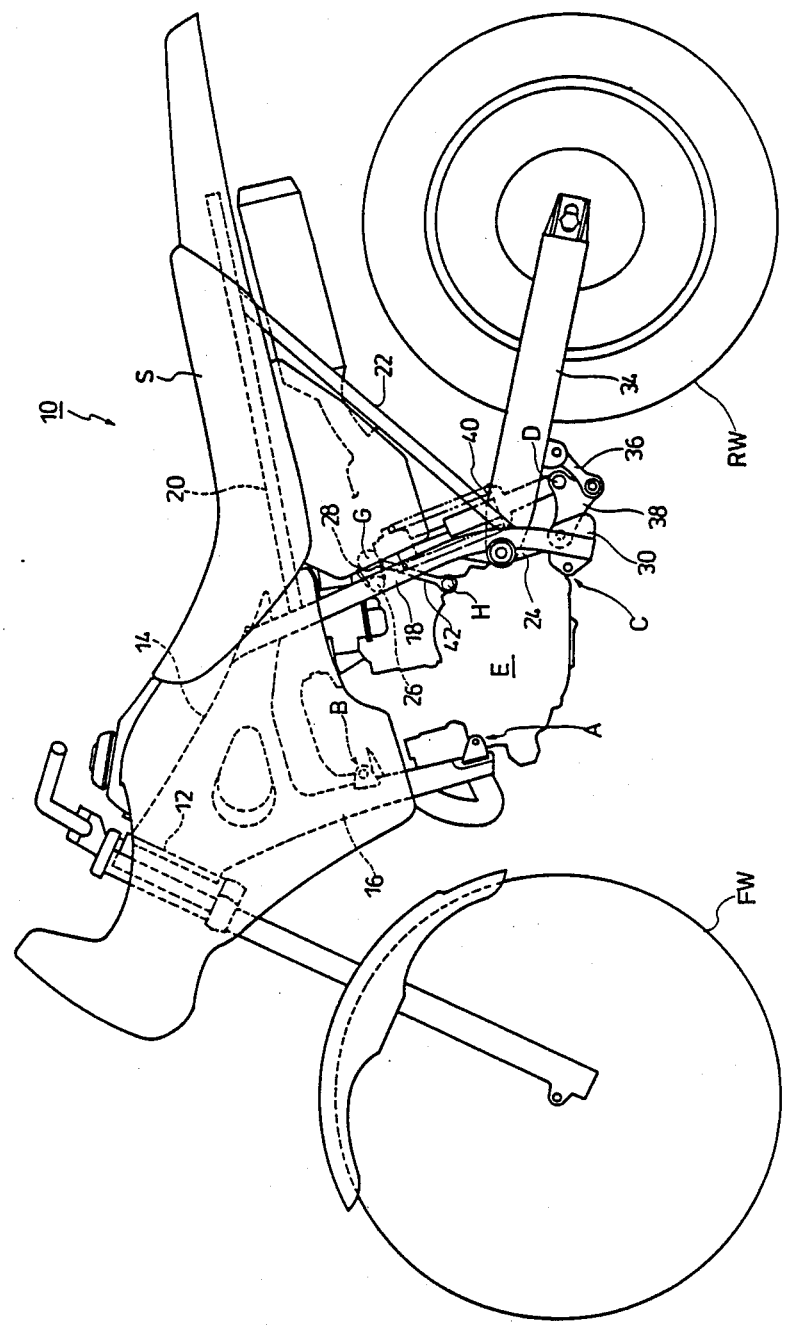
FIG. 2 is a side view of a motorcycle incorporating a rear wheel suspension device according to one embodiment of the present invention.

The motorcycle 10 shown in FIG. 2 is provided with an engine E between a front wheel FW and a rear wheel RW. A vehicle body frame of the motorcycle 10 includes a head pipe 12, which swingably supports a handle rotating shaft; a front frame 16, which extends rearwardly and downwardly from the head pipe 12; and a pair of central frames 18 positioned rearwardly of the engine that extend in a downward direction with respect to the vehicle body toward the rear end of the main frame 14. Also included on the vehicle body frame is a pair of seat supporting frames 20 which extend rearwardly of the vehicle body from the upper portions of the central frames 18 and which support a seat S; and a pair of rear frames 22 that extend from the lower portions of the central frames 18 to the rear portions of the seat supporting frames 20. The engine E is fastened to the front frame 16 and to the central frames 18 at positions indicated as A, B and C.

A rear fork 34 supports the rear wheel RW for rotation by means of a shaft located at its rear end. The front end of the rear fork 34 is swingably supported by a pivot pin that extends through a projecting piece 24 attached to the left and right central frames 18. A damper 40 is disposed between the front portion of the rear fork 34 and the central frames 18. The upper end of the damper 40 is pivotably supported by a pair of projecting pieces 28 attached to a transversely extending frame element 26 which integrally connects the left and right central frames 18. The lower end of the damper 40 is connected to the front portion of the rear fork 34 by means of a well known progressive link mechanism consisting of links 36 and 38. The link 38 is swingably supported through the intermediary of a bolt and a nut on a pair of left and right projecting pieces 30 that are attached to a transversely extending frame element for connecting the lower ends of the left and right central frames At a position D of the link 38 is pivotably supported the lower end of the damper 40. As a result of the connected relationship between the damper 40 and the rear fork 34 as shown in FIG. 2, when the latter swings upwardly, the link 38 pivots in a counterclockwise direction and the link 36 pivots in a clockwise direction, whereby the effective length of the damper 40 is reduced.

Figure 3:
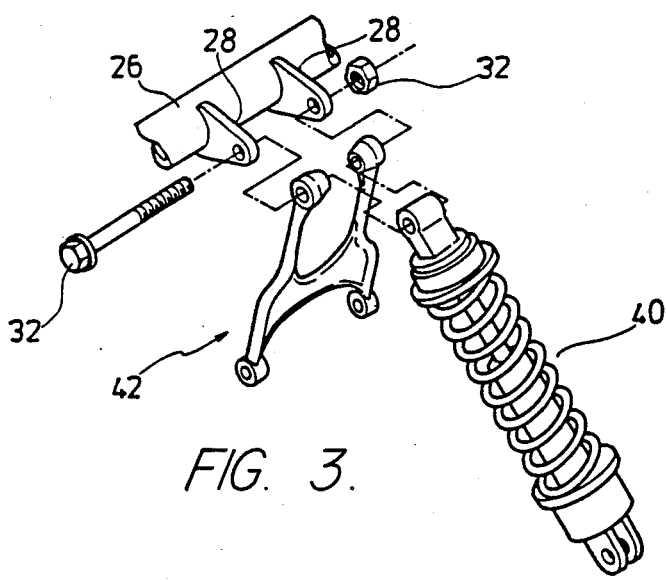
FIG. 3 is an exploded perspective view showing essential parts of the rear wheel suspension device of FIG. 2.
Figure 5:
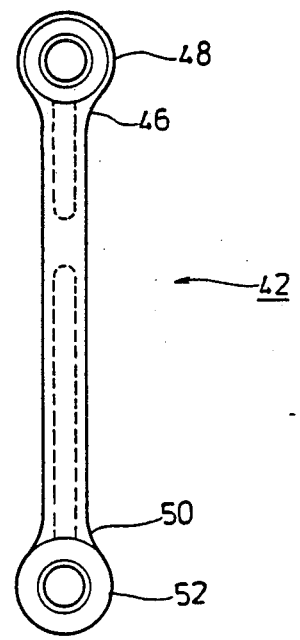
FIG. 5 is a view as seen from the line V—V in FIG. 4.
Figure 4:
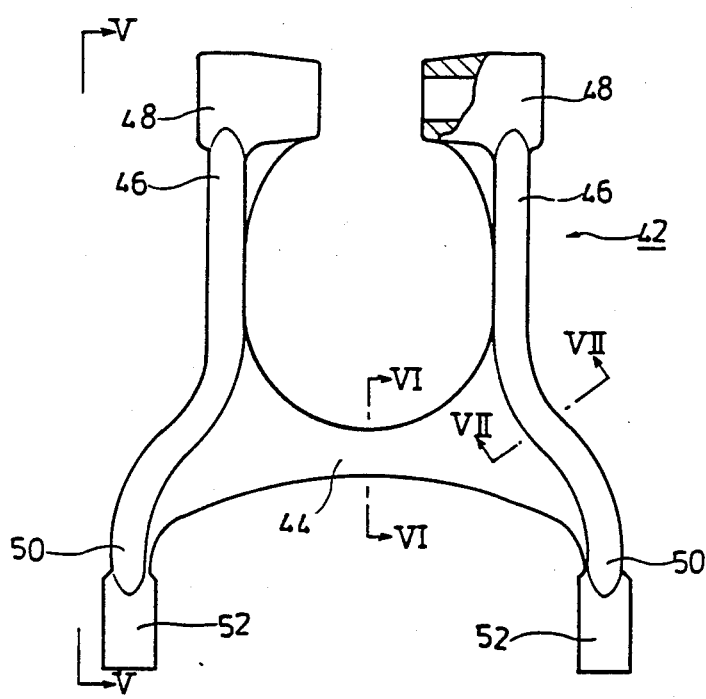
FIG. 4 is a front view of an auxiliary frame, partly in section incorporated in the rear wheel suspension device of the present invention.
Figures 6, 7:
FIGS. 6 and 7 are sectional views taken along lines VI—VI and line VII—VII, respectively, in FIG. 4.

Also, the upper end of the damper 40 is caused to pivot on the projecting pieces 28 and 28 of the transversely extending frame member 26 through the intermediary of a bolt and a nut 32. Likewise, pivotally supported on the shaft of bolt 32 is the upper end of an auxiliary frame 42 of generally "H" shape that is coaxially disposed with respect to the upper end of the damper 40 (FIG. 3). The detailed shape of the auxiliary frame 42 is shown in FIGS. 4 to 7 wherein the frame is shown to be formed by a pair of longer arms 46, a pair of shorter arms 50 and a connecting portion 44 which integrally connects the longer and shorter arms. (FIGS. 6 and 7 illustrate the sectional shapes of the connecting portion 44 and the respective arms.) The longer arms 46 and 46 are provided with bearing cylinders 48 and 48 at their ends and the shorter arms 50 and 50 are provided with bearing cylinders 52 and 52 at their ends.

The auxiliary frame 42 is supported on the projecting pieces 28 and 28 by means of the bolt and nut 32 in a condition in which the upper end of the damper 40 is positioned between the bearing cylinders 48 and 48. Also, the auxiliary frame 42 is pivotably supported at H on the engine E by means of a bolt and a nut (not shown) in a condition in which a projecting portion of the engine E containing a bolt hole H is disposed between the bearing cylinders 52 and 52. Consequently, consideration of FIG. 8 indicates that, if G is the shaft supporting point of the upper end of the auxiliary frame 42 and H is the shaft supporting point of the lower end of the auxiliary frame 42, the shaft supporting point H is lower than the plane which intersects perpendicularly the center axis of the damper 40 through the shaft supporting point G.

Figure 8:
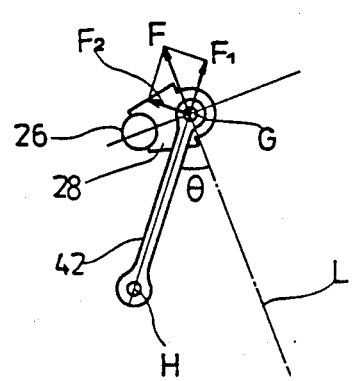
FIG. 8 is a somewhat schematic representation illustrating the loading of forces on the rear wheel suspension device.

According to the structural arrangement of the present embodiment, the projecting piece 28 and the transversely extending frame 26 absorb an impact force received when the vehicle is driven across undulations, or the like, on the road surface during travelling, which force is a factor of the weight of the vehicle body including the weight of the driver, and is transmitted to the pieces 28 and frame 26 through the intermediary of the rear fork 34 and the damper 40. Although the load transmitted to the vehicle body frame via the damper 40 is significantly great, because the pair of projecting pieces 28 are interconnected with the engine E by means of the auxiliary frame 42, the loading is distributed between the frame 26 and the engine. For example, as shown in FIG. 8, since the angle $\theta$ between the auxiliary frame 42 and the longitudinal axis L of the damper 40 is less than 90°, the force, $F_1$, acting on the frame 26 is only a vector component of the total force, F (i.e., $F_1 = F \cos \theta$). The other force component, $F_2$, that is transmitted via the auxiliary frame 42 to the engine E is also less than the total force, F (i.e., $F_2 = F \sin \theta$). Furthermore, since the vector product of the component force, $F_2$, is sufficiently small, as compared with the situation in which the auxiliary frame 42 is not used and the vector product of a load having the central axis of the transversely extending frame 26 as a center, the bending moment and torsion moment acting on the projecting pieces 28 and the transversely extending frame 26 are small. Consequently, the size, represented by the thickness, width and length of the projecting pieces 28, or the outer diameter of the transversely extending frame 26, can be small. Augmenting this is the fact that the component force, $F_1$ is transmitted to, and absorbed by, the front frame 16 and the central frames 18 through the intermediary of the auxiliary frame 42 and the engine E.

FIG. 9 shows a variant of the present invention. In this variant, the upper end of the auxiliary frame 42A is supported by a shaft on the projecting piece 28, together with a damper 40 similar to the above-mentioned embodiment, and the lower end of the auxiliary frame 42A is supported by a shaft on a projecting piece 24, together with a front end of a rear fork 34. In this case, because the angle between the auxiliary frame 42A and the center axis of the damper 40 is small as compared with the angle $\theta$, a greater amount of loading is transmitted via the auxiliary frame 42A, whereby the loading of the projecting piece and the transversely extending frame 26 is further reduced.

As is apparent from the above description, there is provided a rear wheel suspension device for small sized vehicles including an auxiliary frame, one end of which is pivotably supported by a shaft coaxially disposed with respect to the upper end of the damper and the other end of which is pivotably supported by a shaft on the vehicle body frame or the engine, and that the shaft supporting point of the other end of the auxiliary frame is situated lower than the plane which intersects perpendicularly to the center axis of the damper through the shaft supporting point of the one end of the auxiliary frame.

As a result of the arrangement, since the load acting on the vehicle body frame through the intermediary of the damper is transmitted to the auxiliary frame at the shaft supporting portion of the upper end of the damper and further, is dispersed to another place on the vehicle body frame, the loading of the member of the vehicle body frame directly supporting the upper end of the damper is reduced. Accordingly, this member can be formed of reduced thickness, and be small in size and diameter thereby reducing the manufacturing cost of the vehicle and its weight. Also, because the auxiliary frame is pivotally supported by the shaft on the vehicle body frame at one end and is similarly pivotably supported at its other end by another shaft on the vehicle body frame or on the engine, the large load transmitted to the auxiliary frame, when the damper is contracted, is only a pulling force. Consequently, the vehicle body can be further advantageously lightened because the size of the auxiliary frame to be used can be reduced in its diameter and wall thickness.

It should be further understood that, although a preferred embodiment of the invention has been illustrated and described herein, changes and modifications can be made in the described arrangement without departing from the scope of the appended claims.

We claim:
1. A vehicle comprising:
 a body frame;
 longitudinally spaced front and rear wheels and an engine therebetween;
 a rear fork pivotally mounted at its front end to said body frame and rotatably supporting said rear wheel at its rear end;
 a damper connecting between said rear fork and said body frame; and
 a suspension device including an auxiliary frame connecting at one end said damper with said body frame and at its other end to another position on said vehicle, wherein said auxiliary frame and said damper are coaxially pivotably connected to said body frame.

2. A vehicle comprising:
a body frame;
longitudinally spaced front and rear wheels and an engine therebetween;
a rear fork pivotally mounted at its front end to said body frame and rotatably supporting said rear wheel at its rear end;
a damper connecting between said rear fork and said body frame; and
a suspension device including an auxiliary frame connecting at one end said damper with said body frame and at its other end to another position on said vehicle, wherein said other end of said auxiliary frame is pivotably connected to said another position on said vehicle.

3. The vehicle according to claim 2 wherein said another position on said vehicle is lower than the connection between said one end of said auxiliary frame and said body frame.

4. The vehicle according to claim 2 wherein said other end of said auxiliary frame is pivotably connected to said another position of said vehicle by a shaft that is positioned lower than the plane that perpendicularly intersects the longitudinal axis of said damper at the upper end thereof.

5. The vehicle according to claim 4 wherein said auxiliary frame and said damper axis are angularly offset with respect to one another.

* * * * *